Figure 1:
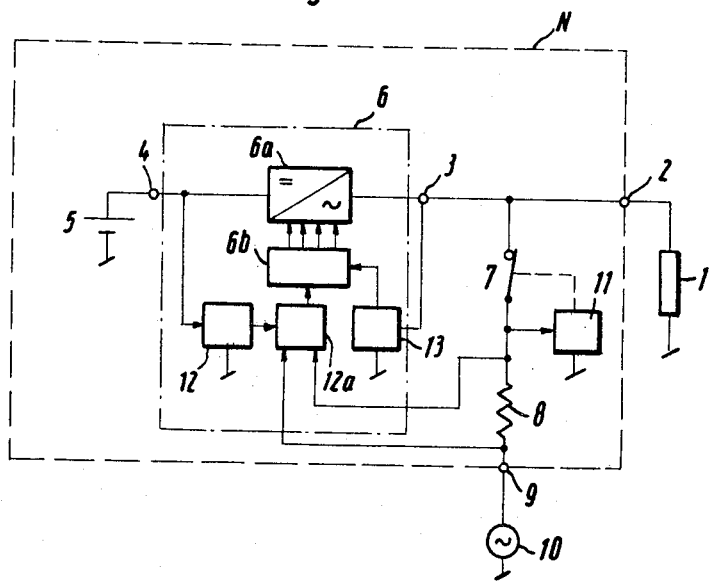

United States Patent [19]

Rathmann

[11] 4,366,390

[45] Dec. 28, 1982

[54] EMERGENCY POWER UNIT

[76] Inventor: Søren H. Rathmann, Juvelvej 74, 8700 Horsens, Denmark

[21] Appl. No.: 293,103

[22] Filed: Aug. 17, 1981

[30] Foreign Application Priority Data

Jul. 16, 1980 [DE] Fed. Rep. of Germany ....... 3128030
Sep. 2, 1980 [DE] Fed. Rep. of Germany ....... 3033034

[51] Int. Cl.$^3$ ............................................... H02J 9/00
[52] U.S. Cl. .................................................... 307/66
[58] Field of Search ............................ 307/64, 66, 67

[56] References Cited

U.S. PATENT DOCUMENTS

| | | | |
|---|---|---|---|
| 3,609,386 | 9/1971 | Patlach .................................. | 307/66 |
| 3,801,795 | 4/1974 | Zajac et al. ........................... | 307/66 |
| 4,044,268 | 8/1977 | Hammel et al. ....................... | 307/66 |
| 4,122,359 | 10/1978 | Breikss ................................... | 307/64 |
| 4,143,283 | 3/1979 | Graf et al. .............................. | 307/66 |
| 4,181,842 | 1/1980 | Elias et al. ............................. | 307/66 |

*Primary Examiner*—Donald A. Griffin
*Attorney, Agent, or Firm*—Wayne B. Easton

[57] ABSTRACT

In an emergency power unit for an alternating current consumer, there are supplied a connection (9) for an alternating current generator (10), a battery (5), which can be charged by rectified current from the alternating current generator (10), a controllable bidirectional converter unit (6), which is located between the said battery and a consumer connection (2), an alternating voltage regulator (13), which stabilizes the alternating voltage on the alternating voltage side (3) of the bidirectional converter unit (6) by means of pulse-width modulation, and a battery voltage regulator (12). The alternating current generator (10) can be connected, in parallel, to the alternating voltage side of the bidirectional converter unit (6), and a current-limiting resistor (8) is located between the alternating voltage side (3) of the bidirectional converter unit (6) and the alternating current generator connection (9). In order to achieve galvanic isolation between the bidirectional converter unit and the alternating current generator, and between the consumer (1) and the alternating voltage generator (10), the current-limiting resistor is designed as a leakage-reactance transformer (8') which has three windings. Of these, one winding (31) is connected directly to the alternating voltage side (3) of the bidirectional converter unit, the second winding (32) is connected to the alternating current generator connections (9, 9a) and the third winding is connected to the consumer connections (2, 2a). The leakage-reactance transformer effects not only galvanic isolation, but at the same time effects the required current-limitation as a consequence of its leakage-inductance.

7 Claims, 7 Drawing Figures

EMERGENCY POWER UNIT

The invention relates to an emergency power unit for an alternating current consumer, this unit having a connection for an alternating current generator, a battery which can be charged by rectified current from the alternating current generator, a controllable static converter, which is located between the said battery and a load connection, an alternating voltage regulator, which stabilizes the alternating voltage on the alternating voltage side of the static converter by means of pulse-width modulation, and a battery voltage regulator for stabilizing the battery voltage.

In the case of a known emergency power unit of this type, the battery is permanently connected, via a charging unit, to the alternating current generator, or to the mains supply, and is permanently connected to the consumer via an inverter followed by a series-connected change-over switch. In addition, the mains supply can also be connected, via a transformer, directly to the consumer, by means of the change-over switch. With this arrangement, the inverter has "precedence," meaning that the consumer is normally continuously supplied via the charging unit, the battery, and the inverter. At the same time, the charging unit ensures that the battery is charged. The charging unit must then be stabilized, so that the battery is fully charged in the event of an emergency, namely in the event of a failure of the mains supply. A current supply is thus assured, which is not subject to interruption even in the event of failure of the mains supply. Should the charging unit, the battery, or the inverter fail, the consumer can automatically be connected to the mains supply, by means of the change-over switch.

Principal fields of application of emergency power units of this type are industrial systems and electronic data-processing systems.

Even in the case of low ratings, an emergency power unit of this type is expensive and, moreover, has a comparatively poor efficiency.

The object underlying the invention is to propose an emergency power unit of this generic type, but which is of simpler construction and has a higher efficiency.

This object is achieved, according to the invention, by a circuit design wherein the static converter is a bidirectional converter unit, wherein the battery voltage regulator stabilizes the battery voltage by shifting the phase position of the alternating voltage on the alternating voltage side of the bidirectional converter unit, relative to the phase position of the output voltage of the alternating current generator, with phase-shifting of the pulses for controlling the bidirectional converter as a function of the battery voltage, wherein the alternating current generator can be connected, in parallel, to the alternating voltage side of the bidirectional converter unit, and wherein a current-limiting resistor is located between the alternating voltage side of the bidirectional converter unit and the alternating current generator connection.

In this design, the bidirectional converter unit operates simultaneously as a charging unit, ensuring not only the stabilization of the battery voltage, but also the stabilization of the alternating voltage output to the consumer on the output side. A separate charging unit, and its losses, are accordingly eliminated. The emergency power unit nevertheless maintains the current supply to the consumer, without interruption, both in the event of a failure of the bidirectional converter unit, and in the event of a failure of the mains supply.

Furthermore, the bidirectional converter unit is capable of feeding the energy, which has been stored in the battery, into the alternating current generator, or into the mains, as desired. In this way, it is possible to check the state of charge of the battery, without losing its energy.

A further advantage resides in the fact that, under normal conditions, the consumer is supplied virtually directly from the alternating current generator, or from the mains, without the consumer current having to flow through a charging unit, or through an inverter, so that the losses, caused thereby, are similarly eliminated.

The current-limiting resistor is preferably located between the alternating current generator connection and the consumer connection. At this point, this resistor limits the current between the battery and the alternating current generator not only in the event of excessively dissimilar voltages, but also in the event of a short-circuit on the alternating current generator side, or on the mains side, without the additional load on the battery which occurs when the mains supply is switched off.

If a switch, which responds in the event of failure of the alternating voltage of the alternating current generator, is located between the alternating current generator connection and the consumer connection, it should preferably be ensured that this switch is an interrupter, or a disconnecting switch. This switch requires only one make-or-break, in contrast to a change-over switch, and is correspondingly less complex, particularly if a switch of the electronic type is concerned.

If the static converter possesses controllable rectifiers with feedback diodes connected in anti-parallel in a bridge circuit, and if the rectifiers of parallel-connected cascades, formed, in each case, by a first rectifier and a second rectifier, are carrying current in alternation at a base switching frequency, the first rectifier of each cascade can be switched, during the idle period of the second rectifier, at a frequency higher than the base switching frequency, so that the pulse-width is modulated, this switching operation being effected by the alternating voltage regulator, via a pulse-width modulator, when the battery is charged and the output voltage of the alternating current generator is too high. In this way, it is possible to operate the bidirectional converter unit as an additional load for the alternating voltage generator, which ensures that the consumer voltage is correspondingly reduced, by division via the current-limiting resistor.

The control signal of the battery regulator can then be superimposed on the control signal of a frequency regulator which is regulating the base frequency of the pulses for controlling the bidirectional converter unit by means of comparing the phases of the output alternating voltage of the bidirectional converter unit and of the alternating current generator. In this way, the base frequency of the bidirectional converter unit is synchronised with the frequency of the alternating current generator, or of the mains supply, and the desired phase-shift between the alternating voltage at the output of the bidirectional converter unit and the alternating voltage at the output of the alternating current generator is effected at the same time.

The current-limiting resistance can be provided by a reactance-coil, whilst the consumer can be connected directly to the alternating voltage side of the bidirectional converter. However, it is commonly necessary, or desirable, that there be galvanic isolation between the static converter, the mains and the consumer.

In order to achieve this metallic isolation at the lowest possible additional expense, the current-limiting resistor can be formed by a leakage-reactance transformer having three windings, one of which is connected to the alternating voltage side of the bidirectional converter unit, the second of which can be connected to alternating current generator connections, which are separate from the consumer connections, and the third of which is connected to the consumer connections.

This leakage-reactance transformer takes care, not only of the galvanic isolation, but at the same time takes care of the necessary current-limiting function. A special current-limiting resistor is accordingly dispensed with.

The leakage-reactance transformer preferably has a U-shaped iron core. Due to its shape and its air gap, this core has a comparatively large leakage-flux, with a correspondingly high leakage-inductance which takes care of the current-limiting function.

In this transformer, it is advantageous if the first winding and the third winding are located on one limb of the U-shaped core part of the U-shaped iron core, and the second winding is located on the other limb of the said core part. By this means, there results a negligibly low leakage-inductance between the first winding and the third winding, since no current-limitation is required between the output of the bidirectional converter unit and the consumer, whilst the leakage-flux between the first winding and the second winding, as well as between the second winding and the third winding, is especially high, due to the greater separation of these windings in relation to the air-gap of the core, and the leakage-inductance between these windings is also correspondingly high.

Figure 2:
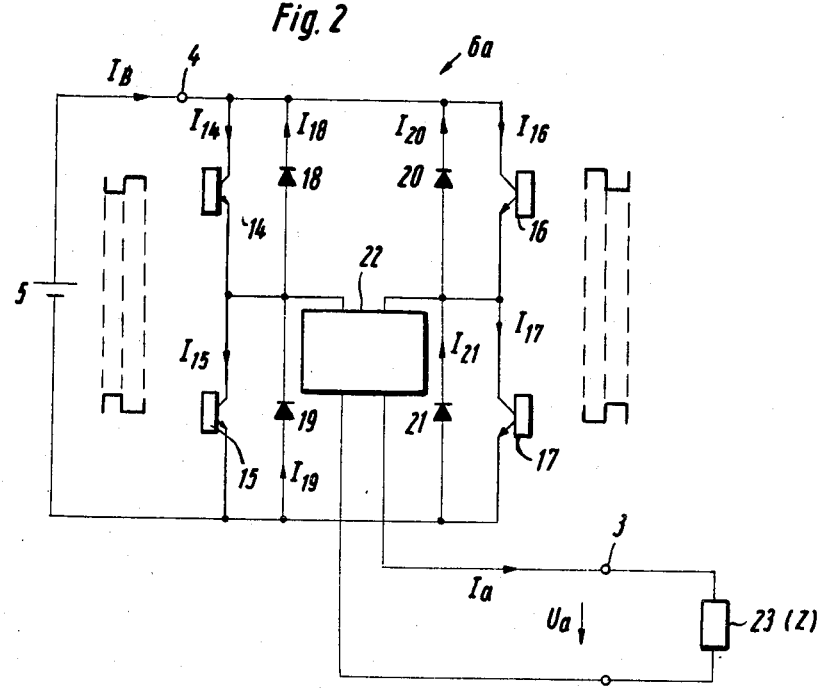
Figure 3:
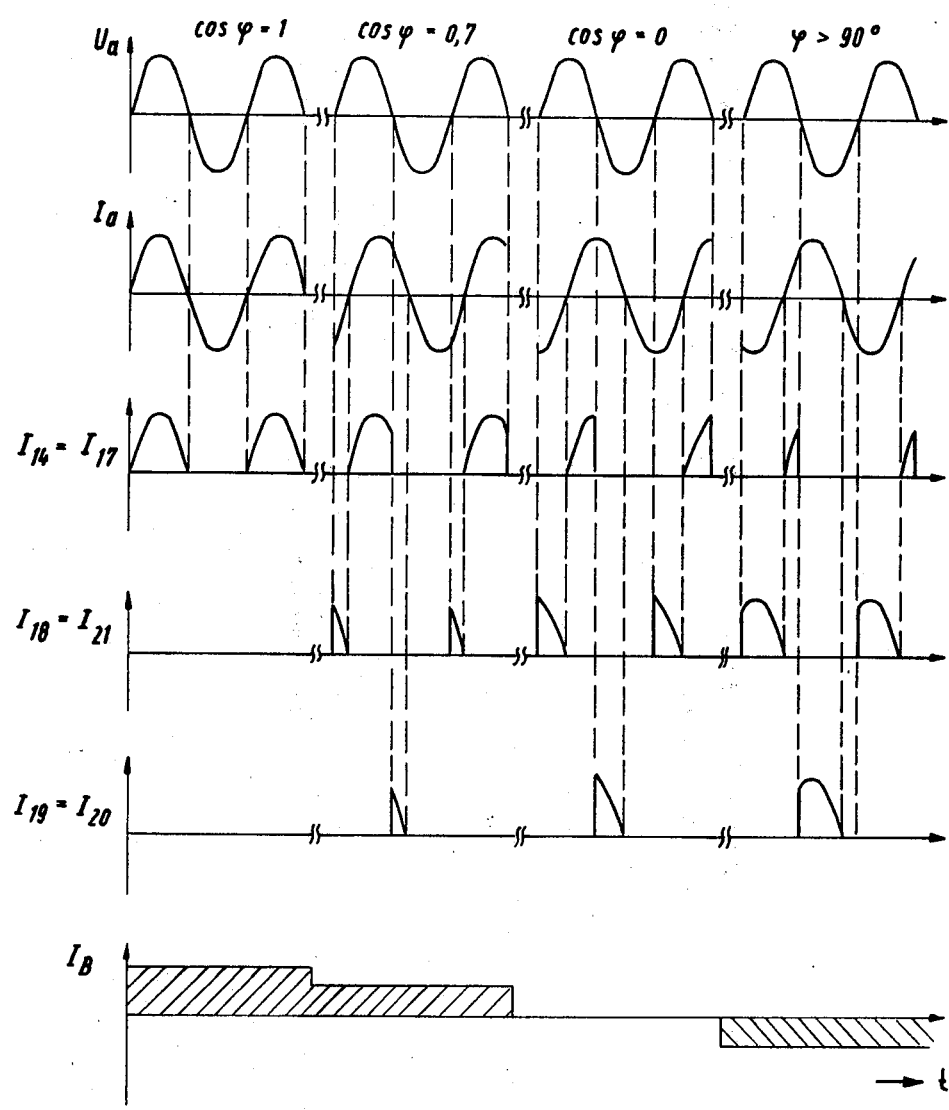
Figure 4:
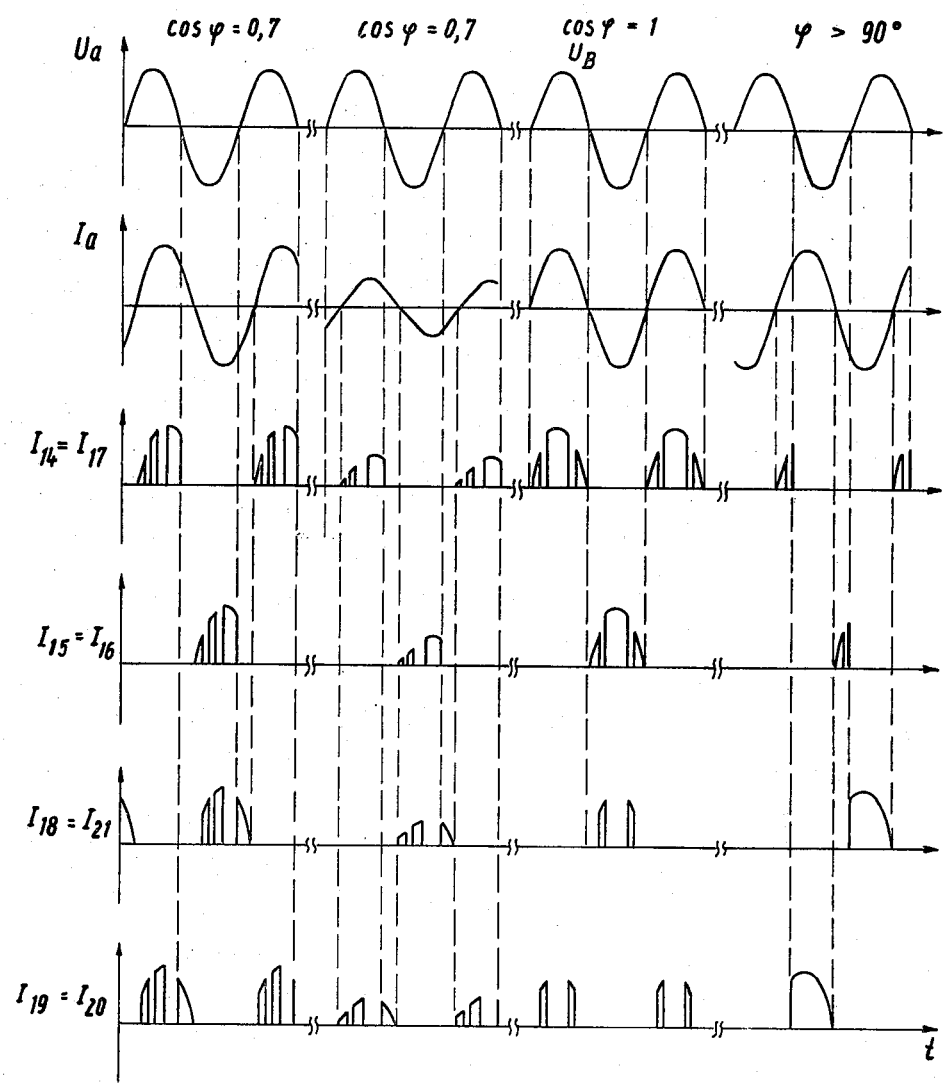
Figure 5:
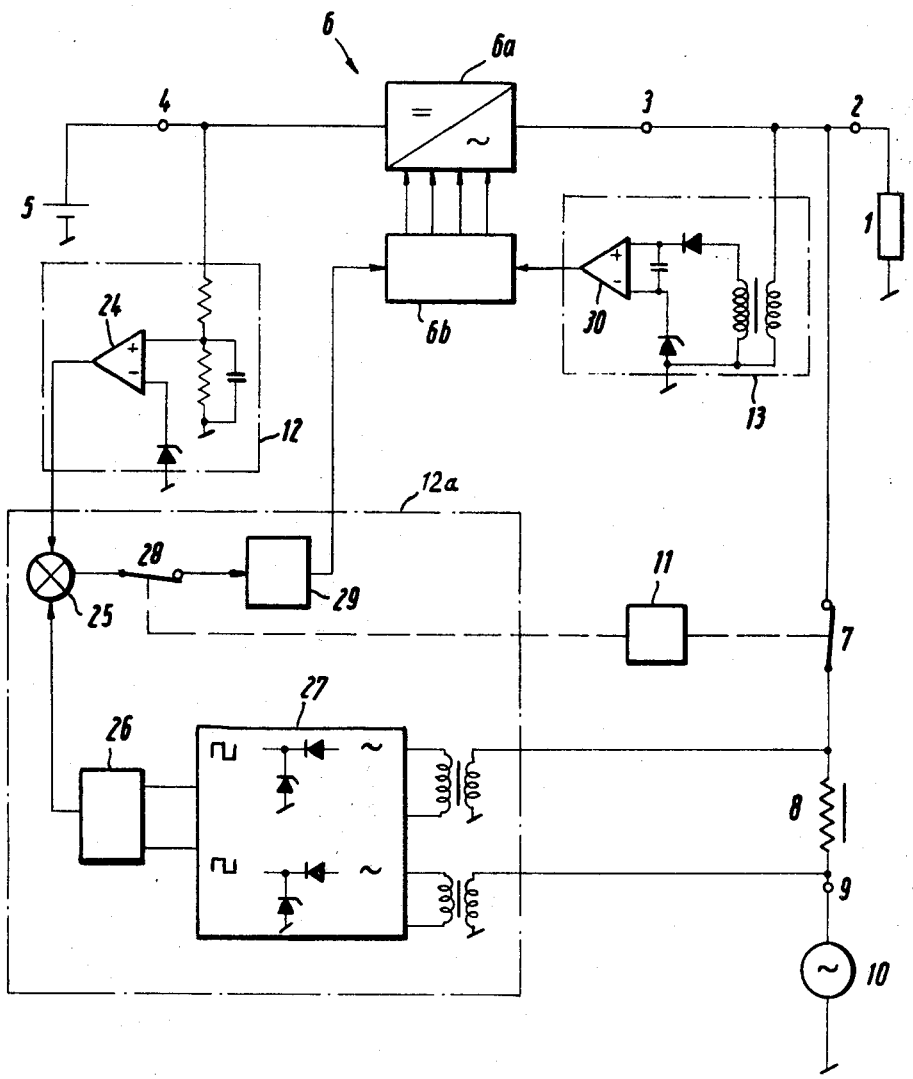
Figure 6:
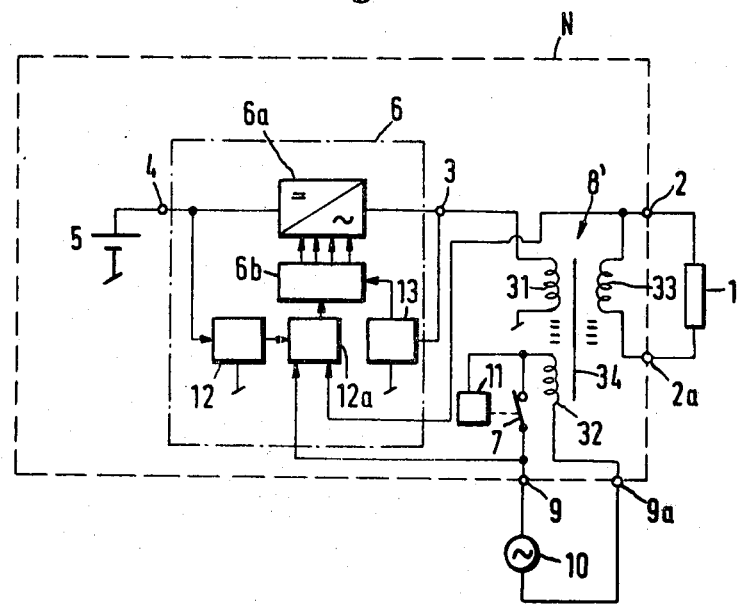
Figure 7:
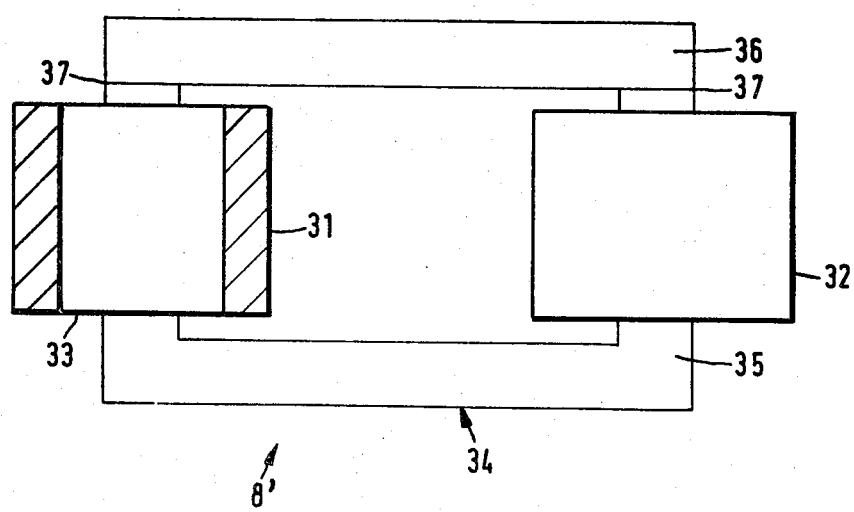

In the text which follows, the invention, and further developments thereof, are described in more detail, by reference to the drawings of preferred illustrative embodiments. In the drawings:

FIG. 1 shows a block circuit diagram of the emergency power unit according to the invention, with an alternating current consumer and an alternating current generator connected thereto, FIG. 2 shows a more detailed circuit diagram of the bridge circuit contained in FIG. 1, with a load which includes the alternating current generator and the consumer, FIGS. 3 and 4 show curves describing the variation, with respect to time, of the voltage and of the current, for the purpose of explaining the mode of operation of the bidirectional converter unit, FIG. 5 shows a more detailed circuit diagram of the emergency power unit according to FIG. 1, FIG. 6 shows a block circuit diagram of a modified emergency power unit according to the invention, and FIG. 7 shows a diagrammatic representation, partially in section, of the transformer contained in the unit according to FIG. 6.

According to FIG. 1, an alternating current consumer 1, for example an inductive impedance, is permanently connected, via a consumer connection 2 of the emergency power unit N, to a connection 3 on the alternating voltage side of a bidirectional converter unit 6, which is connected, by a connection 4 on the direct voltage side, to a battery 5, which can be charged, the said bidirectional converter unit having a bridge circuit 6a, formed by controllable rectifiers and feedback diodes connected in anti-parallel thereto, and having a control unit 6b in the form of a pulse-width modulator. The connection 3 of the bidirectional converter unit 6, on the alternating voltage side, or the consumer connection 2, can then be connected, via an interrupter or disconnecting switch 7 and a compensating or current-limiting resistor 8, in series therewith, to a connection line for an alternating current generator 10, which can be constituted by the conventional alternating current mains supply. A voltage sensor 11, connected to the line between the alternating current generator connection and the disconnecting switch 7, automatically triggers the interruption of this line, by means of the disconnecting switch 7, if the voltage of the alternating current generator 10, or the mains voltage, fails as a result of the fracture of a conductor, or as the result of a short-circuit.

A battery voltage regulator 12, connected by its real value input to the connection 4 of the bidirectional converter unit 6, on the direct voltage side, and to the battery 5, controls the phase position of rectangular control pulses, via a frequency regulator 12a, these pulses being supplied, via the pulse-width modulator 6b, to the control connections of the controllable rectifiers of the bridge circuit 6a, which are preferably transistors. In this process, the phase position of the control pulses is shifted, relative to the output alternating voltage of the alternating current generator 10, in such a way that, in the event of the battery voltage being too low, a pulsating direct current flows from the alternating current generator 10, via the two-way rectifier unit 6 and the connection 4, into the battery 5, this current being higher, on the average, than the current flowing from the battery 5, via the connection 4, into the bidirectional converter unit 6 and to the consumer 1. The battery 5 is thereby charged to the desired required-value, that is to say, the battery voltage is stabilized independently of the load imposed by the consumer 1.

On the other side, an alternating voltage regulator 13, the real value input of which is connected to the connection 3, controls, via the pulse-width modulator 6b, by repeatedly interrupting each pulse controlling the rectifiers incorporated within the bidirectional converter unit, and thus interrupting the rectifiers themselves, the on/off ratio of each pulse, and of the rectifiers, during each cycle, in such a way that the alternating voltage at the connection 3, generated by filtering the rectangular output pulses of the rectifiers, conforms to a constant effective value.

If the alternating current generator 10 or the mains supply fails, and the normal alternating operating voltage is consequently no longer present at the alternating voltage connection 9 of the emergency power unit, the voltage sensor 11 immediately opens the disconnecting switch 7, which is preferably designed as an electronic switch, so that the consumer 1 is now fed, without any interruption in its operating current, from the battery 5, via the bidirectional converter unit 6 which is now operated as an inverter. At the same time, the regulator 13 continues to stabilise the alternating voltage at the connection 3 and at the consumer 1, until the battery 5 is discharged. It is expedient, however, to select a battery 5 having a capacity such that its normal charge is sufficient to continue to provide the consumer with an adequate energy supply until the damage which has led to the failure of the alternating current generator, or of the alternating voltage mains, has been repaired.

When the normal alternating operating voltage is again available at the alternating current generator connection 9 of the emergency power unit, the voltage sensor 11 automatically closes the switch 7, and the consumer 1 is again supplied from the alternating current generator 10. At the same time, the regulator 12 ensures that the battery 5 is recharged, via the bidirectional converter unit 6, which is now acting predominantly as a normal rectifier.

FIG. 2 shows, in a simplified presentation, the bridge circuit 6a, which possesses rectifiers in the form of four transistors 14 to 17, forming an inverter, and four feedback diodes 18 to 21, each connected in anti-parallel to one of the transistors and forming a normal rectifier, and having a filter and transformer stage 22, on the alternating current side, in the central leg of the bridge. In FIG. 2, the alternating current generator 10, the consumer 1, and the current-limiting resistor 8 are represented as a combined load 23 having the impedance Z. The pulses controlling the bridge circuit 6a are represented as rectangular pulses having a fixed pulse-duty factor (ratio of pulse-duration to cycle-duration) of 1:2, or an on/off ratio of 1:1, but the phase position of these pulses can be shifted, by means of the battery voltage regulator 12, which is not represented in FIG. 2, relative to the alternating voltage of the alternating current generator, included in the load 23, whilst keeping the cycle-duration the same as that of the alternating voltage of the alternating current generator 10. This phase-shift means that the current $I_a$ on the output side, flowing into the load 23, is phase-shifted by an angle $\phi$ relative to the output voltage $U_a$ at the load 23, this phase-shift being a function of the phase-shift of the control pulses with respect to the alternating voltage of the alternating current generator 10, of the power-factor of the consumer 1, and of the current-limiting resistance 8. The load 23 can, overall, thus be regarded as a consumer having the resulting power-factor cos $\phi$, which can be altered as a function of the phase-shift imposed on the control pulses.

Using the component-values indicated in the circuit diagram according to FIG. 2, the transistor currents $I_{14}$ to $I_{17}$, the diode currents $I_{18}$ to $I_{21}$, the battery current $I_B$, the output current $I_a$, and the output voltage $U_a$, there result, for example, the time-related variations of voltage and current, represented in FIG. 3, for different phase-shifts of the control pulses and correspondingly different power-factors of the load 23 and phase-shifts $\phi$ between $I_a$ and $U_a$. At the same time, the transistor currents $I_{14}$ to $I_{17}$ are taken from the battery 5, whilst the diode currents $I_{18}$ to $I_{21}$ flow back into the battery. As FIG. 3 shows, the mean value of the transistor currents $I_{14}$ to $I_{17}$ decreases as the power-factor of the load 23 falls, from a maximum when cos $\phi=1$, to a minimum when cos $\phi=0$, that is to say, as the phase-shift angle $\phi$ increases. In doing so, the transistor current which is taken from the battery 5 when cos $\phi=1$ and when cos $\phi=0.7$, is, on the average, greater than the diode current which is fed back, whilst the active power delivered to the load when cos $\phi=0$ is itself 0, since, on the average, exactly as much current is taken from the battery 5, via the transistors, as is fed back via the diodes. This means, in the positive load-factor range of the load 23, for example when cos $\phi=1$ or cos $\phi=0.7$, a net discharge of the battery 5 takes place, although the discharge current $I_B$ also decreases (bottom of FIG. 3) as the power-factor cos $\phi$ decreases. When the power-factor cos $\phi=0$, the battery current $I_B$ is also zero, and the battery 5 is neither discharged nor charged, so that the consumer is supplied solely from the alternating current generator 10. When, however, the phase-shift of the pulses controlling the bridge circuit 6a is further increased, so that the phase-shift angle $\phi$ finally becomes greater than 90°, that is to say, the power-factor cos $\phi$ becomes negative, this means that the load, which has up to then been passive, has now become an active load which, on the average, absorbs no active power, but which delivers active power. At the same time, the mean value of the diode currents $I_{18}$ to $I_{21}$, which are fed back into the battery 5, exceeds the mean value of the transistor currents $I_{14}$ to $I_{17}$, which are taken from the battery 5, and the latter is charged. In this way, by appropriately controlling the phase-shift of the control pulses by means of the regulator 12, it becomes feasible to hold the battery voltage constant at a preset required-value.

If now each control pulse is additionally subjected, for its part, to pulse-width modulation by switching on and switching off, it is even possible to control, in this way, the mean value of the current $I_a$ so that the alternating voltage $U_a$ at the load remains constant. This form of control is shown in FIG. 4, referred to examples of different loads and power-factors. In this form of control, the pulse-width modulation, imposed by the regulator 13, is independent of the phase-angle regulation effected by the regulator 12, so that both the battery voltage and the alternating voltage at the consumer 1 can be regulated, independently of one another, by the two regulators 12 and 13.

Should, when the battery 5 is in the charged state, the alternating voltage of the alternating current generator 10 rise to an excessively high value, so that it is significantly higher than the alternating voltage of the bidirectional converter unit 6 at the connection 3, whilst the load is, moreover, very low, regulation difficulties can occur in the case of the given impedance-value of the current-limiting resistor 8: the voltage-division between the current-limiting resistance 8 and the output resistance of the bidirectional converter unit, required in order to achieve a constant voltage, is no longer possible and the output voltage of the bidirectional converter unit rises proportionally to the voltage of the alternating current generator 10. These difficulties can be avoided by operating the bidirectional converter unit 6 as a switch-controlled load-resistance, by means of the regulator 13 and the pulse-width modulator 6b, in that the transistors 15 and 17 are alternately switched, without modulation, with a pulse-duty factor of 50%, and the transistors 14 and 16 are alternately switched, with pulse-width modulation, at a higher pulse frequency. In doing so, a flow of current into the battery 5 is prevented, and an artificial load-resistance is applied, parallel to the consumer 1, this artificial resistance correspondingly reducing the output voltage $U_a$ to the required value at the connection 3, and hence at the consumer 1.

FIG. 5 shows a more detailed circuit diagram of the emergency power unit. According to this diagram, the battery voltage regulator 12 possesses a differential amplifier 24, a voltage-divider, with smoothing capacitor, connecting the non-reversible input of the said amplifier to the connection 4, and a Zener diode supplying the required-voltage to the reversing input of the differential amplifier 24.

The control signal of the regulator 12, on the output side, is superimposed on the control signal of the frequency regulator 12a in a summing element 25. The control signal of the frequency regulator 12a is generated by a phase-comparator 26, which compares the phases of the alternating voltages of the alternating current generator 10 and of the bridge circuit 6a, these voltages being transformed into rectangular signals by a pulse-generator 27, and which converts the phase-difference into a corresponding direct voltage. The cumulative signal of the summing element 25 is fed, via a disconnecting switch 28, to a voltage-controlled oscillator 29, the frequency of which is proportional to its control voltage. The output signal of the oscillator 29 determines the base switching frequency of the rectifiers in the bridge circuit 6a and is subjected to pulse-width modulation, in the manner described, by means of the output signal of the alternating voltage regulator 13, so that while the alternating output voltage of the bridge circuit 6a, at the connection 3, is equal to the frequency of the alternating voltage of the alternating current generator 10, the phase of the former is shifted with respect to the latter by an angle at which the desired charging voltage of the battery 5 is produced, when the output signal of the summing element 25 is zero or approximately zero.

The alternating voltage regulator 13 similarly possesses a differential amplifier 30, which compares the rectified and smoothed alternating output voltage, at the connection 3, with the voltage, at a Zener diode, defining the required-value of the alternating output voltage, and supplies a signal, which is proportional to the control deviation and the magnitude of which defines the pulse-width, to the pulse-width modulator 6b, as a control signal.

In FIG. 6, components identical to those of the emergency power unit N according to FIG. 1 are marked with the same reference numbers, so that their construction is not described for a second time.

The current-limiting resistance 8 of the emergency power unit N, according to FIG. 1, is formed by a leakage-reactance transformer 8', which possesses three windings 31, 32, 33, and an iron core 34. In place of the common connection for the alternating current consumer 1 and the alternating current generator 10, which is connected, in the case of the emergency power unit according to FIG. 1, to the neutral connection of the bidirectional converter unit 6, this connection being represented by the conventional ground symbol, a second connection 2a to the emergency power unit N is provided for the consumer 1, in addition to the connection 2, and a second connection 9a to the said unit N is provided for the generator 10, in addition to the connection 9, there being galvanic isolation between the connections 2a, 9a and the neutral connection of the bidirectional converter unit 6.

The winding 31 is connected directly to the output side, to the connection 3, and to the neutral connection of the bidirectional converter unit 6.

The winding 32 is connected, on the one side, to one alternating current generator connection 9, via the disconnecting switch 7, and, on the other side, directly to the second alternating current generator connection 9a, whilst the winding 33 is connected directly to the consumer connections 2, 2a, and the connection 3 of the bidirectional converter unit 6 is furthermore connected directly to the input of the alternating voltage regulator 13, but the latter connection is not directly connected to the consumer connection 2. In contrast, the consumer connection 2 is connected directly to one input of the frequency regulator 12a. The voltage sensor 11 is connected to the line between the winding 32 and the disconnecting switch, and automatically initiates the interruption of this line, by means of the disconnecting switch 7, if the voltage of the alternating current generator 10, or the mains supply voltage, fails as the result of a conductor fracture, or as the result of a short-circuit.

The battery voltage regulator 12, which is connected, by its real value input, to the connection 4 on the direct voltage side of the bidirectional converter unit 6, and to the battery 5, controls the phase position of the rectangular control pulses, via the frequency regulator 12a, these pulses being supplied, via the pulse-width modulator 6b, to the control connections of the controllable rectifiers of the bridge circuit 6a. In this process, the phase position of the control pulses is shifted, relative to that of the output alternating voltage of the alternating current generator 10, in such a way that, in the event of the battery voltage being too low, a pulsating direct current flows from the alternating current generator 10, via the transformer 8' and the bidirectional converter unit 6, into the battery 5, this current being higher, on the average, than the current flowing from the battery 5, via the bidirectional converter unit 6 and the transformer 8', to the consumer 1. The battery 5 is thereby charged to the desired required-value, that is to say, the battery voltage is stabilised independently of the load imposed by the consumer 1.

On the other side, the alternating voltage regulator 13, the real value input of which is connected to the connection 3, controls, via the pulse-width modulator 6b, by repeatedly interrupting each pulse controlling the rectifiers incorporated within the bidirectional converter unit, and thus interrupting the rectifiers themselves, the on/off ratio of each pulse, and of the rectifiers, during each cycle, in such a way that the alternating voltage at the connection 3, generated by filtering the rectangular output pulses of the rectifiers, conforms to a constant effective value. If the alternating current generator 10 or the mains supply fails, and the normal alternating operating voltage is consequently no longer present at the alternating voltage connection 9 of the emergency power unit, the voltage sensor 11 immediately opens the disconnecting switch 7, so that the consumer 1 is now fed, without any interruption in its operating current, from the battery 5, via the bidirectional converter unit 6, which is now operated as an inverter, and via the transformer 8'. At the same time, the regulator 13 continues to stabilize the alternating voltage at the connection 3 and at the consumer 1, until the battery 5 is discharged. It is expendient, once again, to select a battery 5 having a capacity such that its normal charge is sufficient to continue to provide the consumer 1 with an adequate energy supply until the damage which has led to the failure of the alternating current generator, or of the alternating voltage mains, has been repaired.

When the normal alternating operating voltage is again available at the alternating current generator connection 9 of the emergency power unit, the voltage sensor 11 automatically closes the switch 7, and the consumer 1 is again supplied from the alternating current generator 10, via the transformer 8'. At the same time, the regulator 12 ensures that the battery 5 is recharged from the alternating current generator 10, via the transformer 8' and via the bidirectional converter unit 6, which is now acting predominantly as a normal rectifier.

FIG. 7 shows, in a simplified presentation, the construction of the leakage-reactance transformer 8', which takes care of the galvanic separation of the components 1, 10 and 6, and at the same time limits the current between the connections 3 and 9, and between the connections 2 and 9. This transformer has a U-shaped iron core 34, made of a U-shaped core part 35 and an I-shaped core part 36, between which an air-gap 37 is formed.

The windings 31 and 33 are wound on one limb of the U-shaped core part 35, whilst the winding 32 is located on the other limb of the core part 35. An appreciable leakage-flux results between the windings 31 and 32, and between the windings 32 and 33, on account of their larger separation and on account of the air-gap 37, the leakage-inductance of this flux having a current-limiting effect, whilst the windings 31 and 33 are very closely coupled, so that their leakage-inductance can be disregarded.

I claim:

1. An emergency power unit for an AC consumer, comprising, a battery, an input terminal for an AC generator, a controllable bidirectional converter unit between said battery and said input terminal, an AC consumer output terminal between said battery and said input terminal, current limiting means between the AC side of said converter unit and said AC generator input terminal, AC voltage regulator means for stabilizing the AC voltage on the AC side of said converter unit by pulse width modulation means, battery voltage regulator means for stabilizing battery voltage by shifting the phase position of the AC voltage at said consumer output terminal relative to the phase position at said input AC terminal by phase shifting the pulses for controlling said converter unit as a function of the battery voltage, said AC generator input terminal being in parallel to the AC voltage side of said converter unit.

2. Emergency power unit as claimed in claim 1, wherein said current limiting means is located between said AC generator input terminal and said AC consumer output terminal.

3. Emergency power unit as claimed in claim 1 or claim 2, in which an interrupter switch which responds in the event of failure of the alternating voltage of the alternating current generator is located between said AC input terminal and said consumer output terminal.

4. Emergency power unit as claimed in one of the claims 2 or 3, in which said converter unit has a bridge circuit including controllable rectifiers with feedback diodes connected in anti-parallel thereto, said bridge circuit having first and second rectifiers in parallel connected cascades carrying current in alternation at a base switching frequency wherein said first rectifier of each said cascade can be switched during the idle period of said second rectifier thereof at a frequency higher than said base switching frequency so that the pulse-width is modulated, this switching operation being effected by said AC voltage regulator via a pulse-width modulator when said battery is charged and the output voltage of an AC generator connected to said AC input is too high.

5. Emergency power unit according to one of the claims 1 to 4, including a frequency regulator for regulating the base frequency of the pulses for controlling said converter unit by means of comparing the phases of the output AC voltage of said converter unit and of the AC generator connected to said AC input, the control signal of said battery voltage regulator being superimposed on the control signal of said frequency regulator.

6. Emergency power unit as claimed in one of claims 1 to 5, wherein said current limiting means is formed by a leakage-reactance transformer having three windings of which one winding is connected to the alternating voltage side of said converter unit, the second winding being connected to said AC generator input terminal which is separated from said load output terminal, and the third winding is connected to said load output terminal.

7. Emergency power unit as claimed in claim 6, wherein said first winding and said third winding are located on one limb of a U-shaped core part of a U-shaped iron core, and said second winding being located on the other limb of the said core part.

* * * * *